United States Patent [19]

Dompé

[11] Patent Number: 4,979,850
[45] Date of Patent: Dec. 25, 1990

[54] APPARATUS FOR PRECISION LINE BORING OF ENGINES AND LIKE MECHANISMS

[76] Inventor: Olman Dompé, 860½ Taft Pl., New Orleans, La. 70119

[21] Appl. No.: 500,716

[22] Filed: Mar. 28, 1990

Related U.S. Application Data

[63] Continuation-in-part of Ser. No. 58,528, Nov. 1, 1988, abandoned.

[51] Int. Cl.⁵ ............................................. B23B 41/12
[52] U.S. Cl. ............................. 408/72 R; 408/241 S; 408/708
[58] Field of Search .................... 408/54, 72 R, 79, 80, 408/110, 111, 241 S, 708, 709

[56] References Cited

U.S. PATENT DOCUMENTS

| | | | |
|---|---|---|---|
| 3,331,266 | 7/1967 | Brooks | 408/111 X |
| 3,751,175 | 8/1973 | Brooks | 408/80 X |
| 3,767,316 | 10/1973 | Dumont, Jr. | 408/79 |
| 3,880,544 | 4/1975 | Papadopulos | 408/709 X |
| 4,451,186 | 5/1984 | Payne | 408/54 |
| 4,730,958 | 3/1988 | Banoczky | 408/708 X |
| 4,850,756 | 7/1989 | Dubois | 408/708 X |

*Primary Examiner*—Steven C. Bishop
*Attorney, Agent, or Firm*—John F. Sieberth

[57] ABSTRACT

A sleeve is axially aligned with the bore which is to be cut by a cutting bar rotated in the sleeve. The sleeve is placed and held in proper position by radially projecting brackets having holes in them. These holes are aligned with holes in a member having its holes in preselected positions remote from the axis of the bore. The sleeve also serves as a stop to prevent excessive forward or rearward longitudinal travel of the cutting bar by abutment with collars detachably secured at suitable positions on the bar.

17 Claims, 6 Drawing Sheets

APPARATUS FOR PRECISION LINE BORING OF ENGINES AND LIKE MECHANISMS

REFERENCE TO RELATED APPLICATION

This is a continuation-in-part of my prior copending application Ser. No. 07/058,528, filed Nov. 1, 1988, and now abandoned.

BACKGROUND

Frequently it is necessary because of excessive oil leakage to replace worn crankshaft bearings in internal combustion engines. This usually requires re-boring of the engine block along the axis of the crankshaft so that new oversized sleeve bushings and bearings can be installed in place of the worn bearings.

Heretofore this operation, generally known as line boring, has been difficult, time-consuming and expensive because of the need to carefully center and align the boring tool used for this operation. Some of the difficulties encountered in line boring operations are referred to, for example, in Brooks U.S. Pat. No. 3,751,175, Payne U.S. Pat. No. 4,451,186, and Banoczky U.S. Pat. No. 4,730,958, each of which proposes apparatus designed to ameliorate the problem.

SUMMARY OF THE INVENTION

This invention utilizes to great advantage the fact that in some vehicles as manufactured (for example Volkswagen automobiles equipped with air-cooled engines, and certain models of Subaru automobiles), the front wall of the transmission housing (hereinafter called "front wall") and the engine block are in precise alignment, and that in order to attach the remainder of the transmission housing to the front wall, apertures to accommodate nuts and bolts are provided at precise locations in the front wall near its perimeter.

Pursuant to this invention a sleeve is provided having a plurality of radially-extending brackets rigidly affixed thereon, each bracket being sized and disposed (positioned) to extend to the locus (location or position) of one of such apertures in the front wall, and each bracket having an aperture therein adapted to be placed in direct alignment or registration with the proximate aperture in the front wall. When so positioned, the aperture in the respective brackets and its proximate aperture in the front wall are contiguous and form a bore adapted to receive a linear, and preferably cylindrical, fastener (e.g., a bolt, machine screw, dowel pin or the like) so that all of the brackets can be detachably secured to the front wall with the front wall interposed between the sleeve and the engine block. Additionally, the brackets are sized and configured such that when the brackets are detachably secured to the front wall in this manner, the sleeve is axially aligned with the axis of engine bore normally accommodating the crankshaft and the crankshaft bearings. The sleeve in turn has a cylindrical linear bore sized to slidably and rotatably receive a rotable cutting or boring bar formed with blind openings for receiving cutters. The cutters are disposed at suitable positions on the forward portions of the cutting bar so that when a median or rearward portion of the cutting bar is disposed within the sleeve bore and the bar is rotated and slidably moved in a forward direction, the cutters will bore out the engine block in a precisely aligned manner.

Thus the brackets and sleeve cooperate with each other to position and axially align the cutting bar in the precise position needed to bore the block for receipt of a new set of oversized bearings and bearing sleeves. In addition, the sleeve is long enough to precisely orient the cutting bar so that it is kept in precise axial alignment with the axis of the bore for the crankshaft and cranskhaft bearings. In other words, the sleeve keeps the cutting bar from deviating from the proper axis. Moreover, the brackets can be attached to and detached from the front wall quickly and very easily. And what's more, the assembly is not only portable, but it reproducibly centers and axially aligns the sleeve from one engine to the next provided only that the engines are of the same make and model. In essence, then, the precision with which the original engine manufacturer designed, manufactured and assembled the engine block and transmission casing can be utilized to re-bore the engine block (including saddles, etc.) with essentially the same precision.

These and other features of this invention will be apparent from the ensuing description, appended claims and accompanying drawings in which:

It is to be understood that this invention is not limited in any way by the dimensions and specific construction details presented in the Drawings. Such dimensions and details are presented as a precautionary measure to insure fulfillment of the "best mode" requirement of the Patent Statute as set forth in 35 USC 112.

In the preferred forms depicted in the Drawings the system shown is especially adapted for line boring of standard production models of Volkswagen engine cases or blocks of 1200, 1300, 1500 and 1600 cubic centimeter size. Such cases or blocks are formed from relatively soft metal alloys and accordingly line boring with a system of this invention such as depicted in the Drawings can be accomplished by rotating the cutter bar assembly with a ⅜-inch hand-held electric power drill unit. It will be understood however that the principles of this invention can be applied to line boring of other engine blocks or casings and that other power sources can be used for effecting rotation of the system. All that is necessary is that the engine or other article being bored be equipped with an apertured wall capable of receiving for detachable attachment a line boring system of this invention wherein the axis of the sleeve is placed in axial alignment with the bore when such detachable attachment is made.

Figure 1:
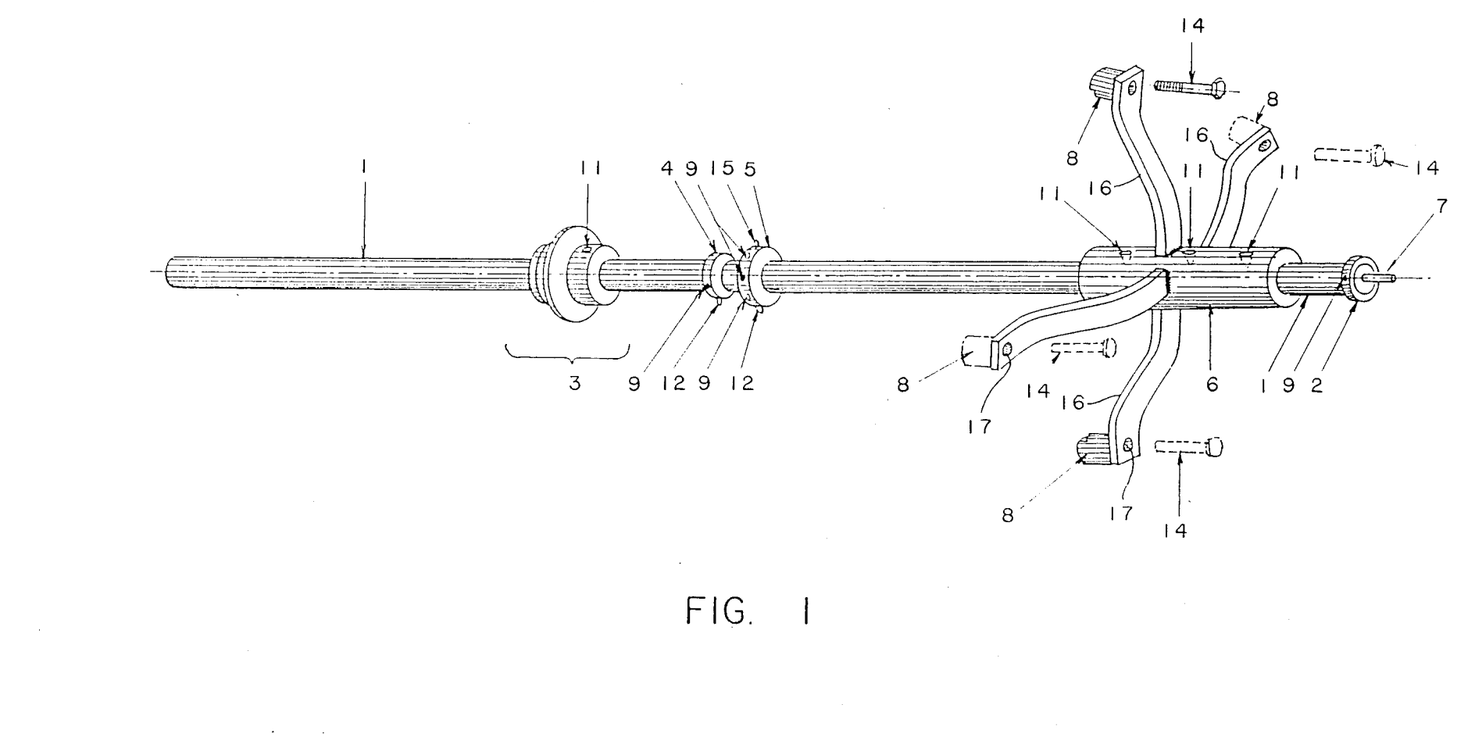
FIG. 1 is a perspective view of a line boring system of this invention.
Figure 2:
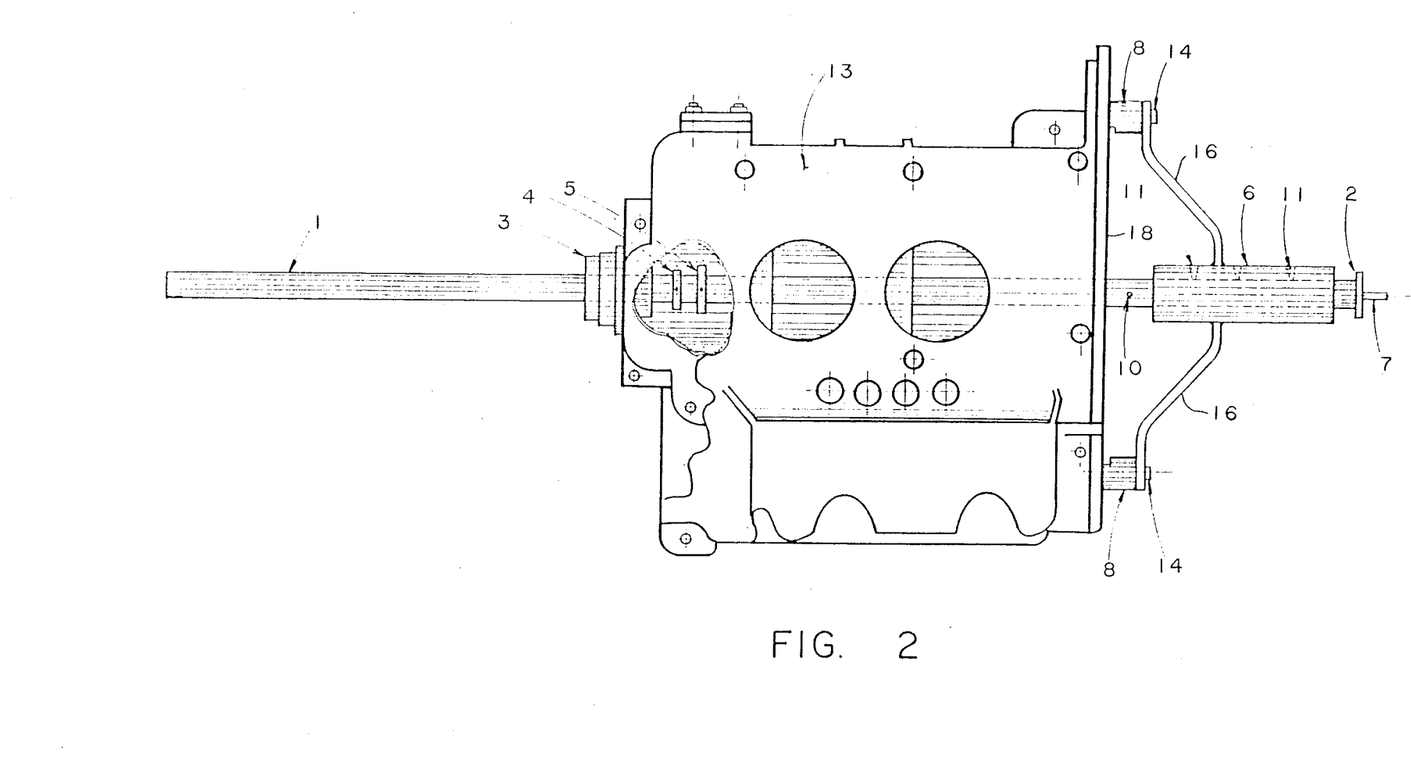
FIG. 2 is a side view of a line boring system of this invention detachably secured to the front wall of a transmission housing, the line boring system being in a line boring position relative to the engine block.
Figure 3:
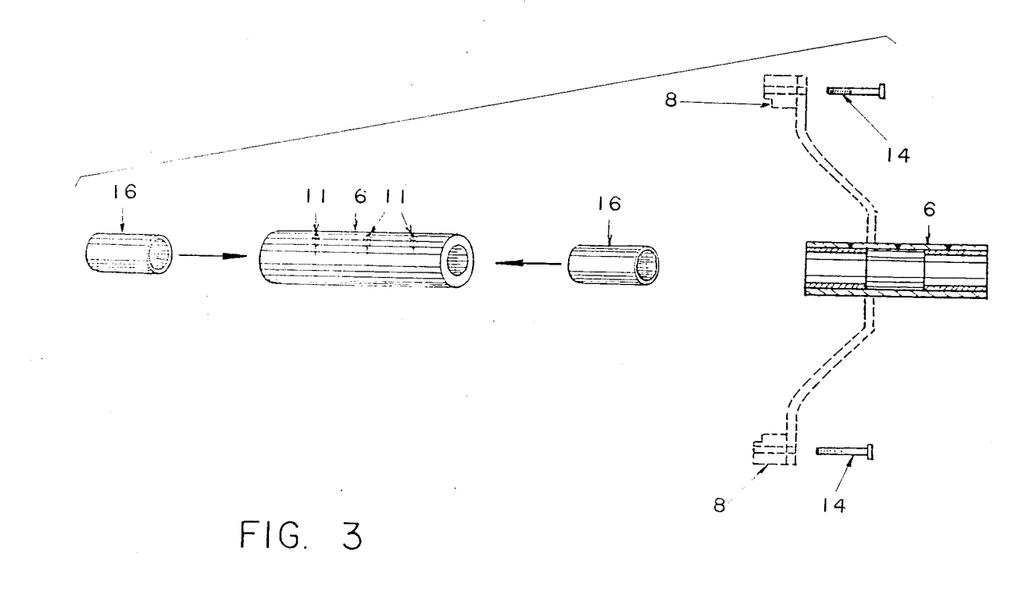
FIG. 3 is a set of construction drawings showing details of a preferred sleeve construction of this invention.
Figure 4:
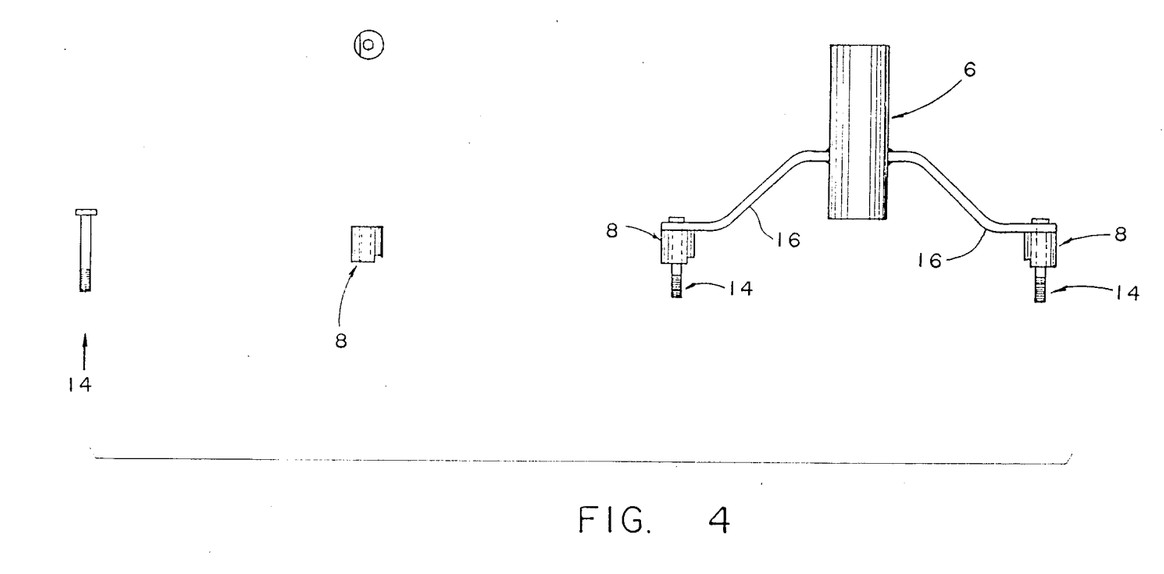
FIG. 4 is a set of construction drawings of a preferred bracket assembly of this invention affixed to a typical sleeve used pursuant to this invention, and including spacers and mounting bolts.
Figure 5:
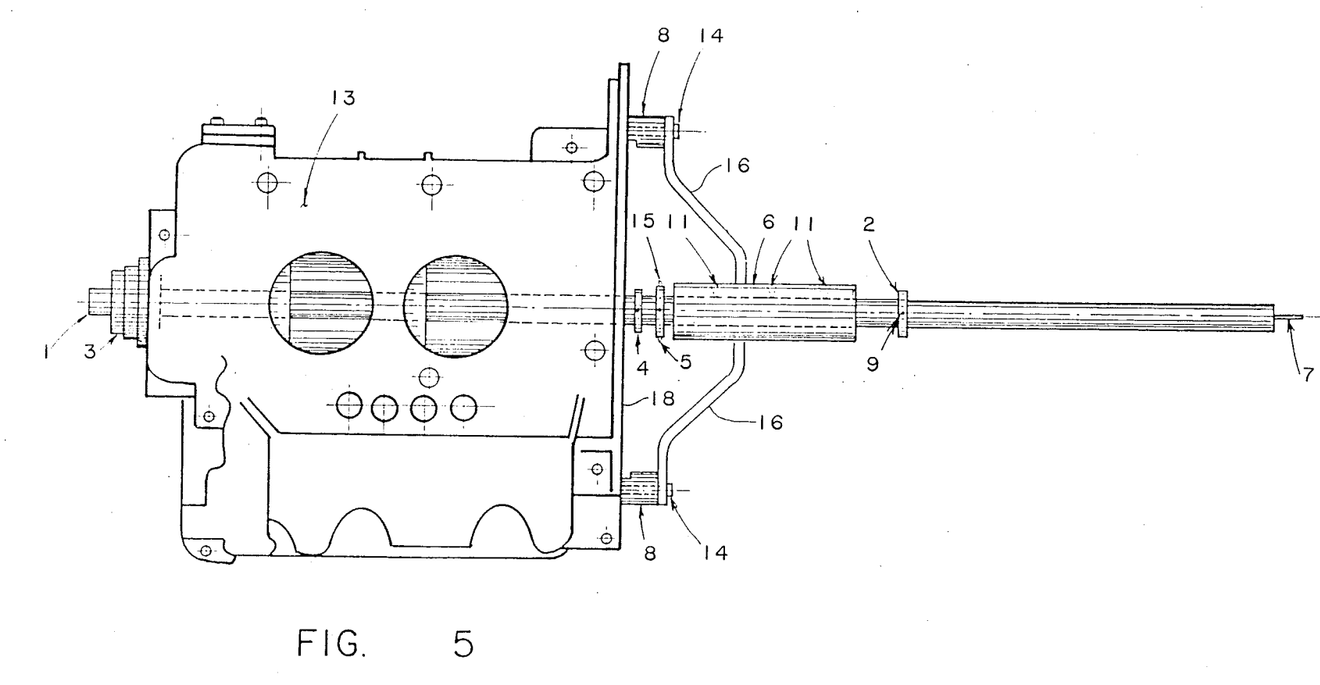
FIG. 5 is a view similar to that of FIG. 2 but with the system in a different working position for in line boring.
Figure 6:
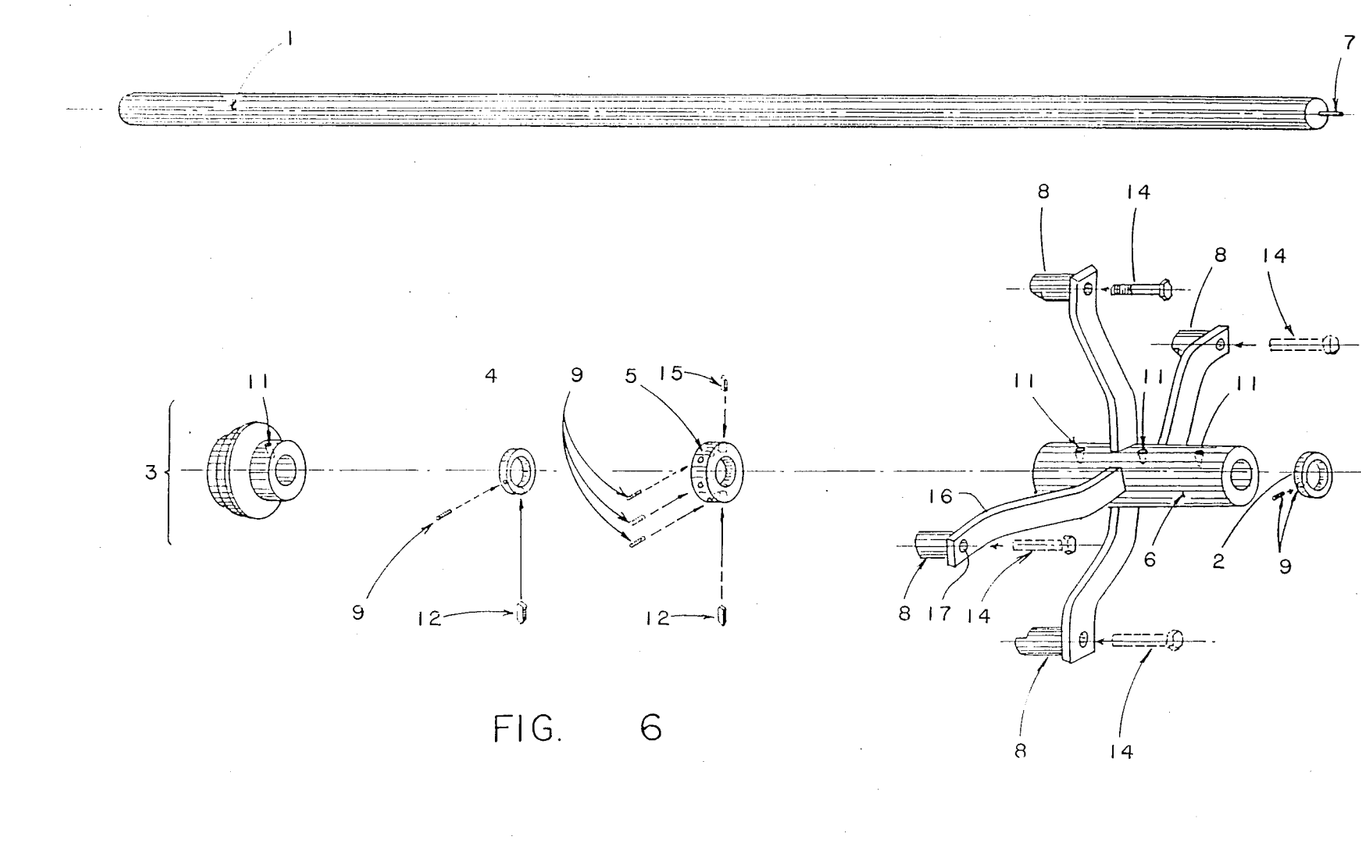
FIG. 6 is a exploded view in perspective illustrating a cutter bar and the positioning of elements thereon.

As depicted, the system basically comprises cutter bar 1, sleeve 6, and four radially projecting brackets 16, each bracket having an aperture 17 near its outer end. In the perspective view of FIGS. 1 and 6 the positioning of the most remote (rearward) bracket has been distorted to enable it to be seen more readily. For use with Volkswagen blocks or casings of the type referred to above and other blocks or devices with fastening apertures radially disposed in a similar symmetrical pattern, the four brackets will be disposed at approximately 90° intervals around sleeve 6. However the systems of this invention can be produced having different dispositions and numbers of such brackets so as to accommodate other line boring situations. As seen in FIGS. 2 and 5 the engine block or casing 13 is affixed at its back end to front wall 18 which comprises part of the transmission housing (not shown). Front wall 18 has apertures therein in its outer portions, and brackets 16 are sized and positioned on sleeve 6 such that each aperture 17 can be aligned with a respective aperture in front wall 18. Mounting bolts 14 are inserted into these aligned pairs of apertures to detachably secure brackets 16 and sleeve 6 to front wall 18. When so mounted sleeve 6 is axially aligned with the axis of the engine bore for the crankshaft bearings and bushings.

In the form depicted, cutter bar 1 carries in appropriate positions along its length collar bit cutter assemblies 4 and 5 of different diameters. Each such collar bit cutter assembly includes one or more Allen screws 9 to hold the assembly in its selected position on cutter bar 1, and a tool bit 12, 15 of suitable size to effect the actual cutting on rotation of the cutter bar. Also detachably secured to cutter bar 1 is a travel limit collar 2 which when fastened in appropriate position on the cutter bar abuts the back end of sleeve 6 to prevent further longitudinal travel in the forward direction. Such adjustable positioning of collar 2 is illustrated in, and can be seen by comparing, FIGS. 2 and 5. One or more Allen screws 9 are provided in collar 2 in order to secure the collar in the desired position on bar 1. Most preferably, cutter bar 1 is provided along its length with a plurality of notches or recesses 10, one of which is illustrated in FIG. 2. These notches or recesses enable the collar bit cutter assemblies 4 and 5, and travel limit collar 2 to be firmly attached by means of the Allen screws to cutter bar 1 so that assemblies 4 and 5 and collar 2 are in precise predetermined positions used in conducting repetitive boring operations on a plurality of the same type and size of engine blocks or casings.

Projecting axially from at least the rearward end of bar 1 is pilot or pin 7 which serves as the locus of attachment for the chuck of a power drill or other like power source for effecting rotation of the entire cutter bar assembly.

In the preferred system depicted, a hollow spacer 8 is interposed between each aperture 17 and its proximate co-aligned aperture in front wall 18. As best seen in FIG. 5, the use of a spacer 8 between each aperture 17 and the co-aligned aperture in front wall 18 allows the rear wall of the engine block to be bored by a suitably sized cutter bit assembly (in this instance, collar bit cutter assembly 5) for receipt of an oversized thrust bearing and bushing. The utilization of the spacers 8 in this manner is also advantageous as it enables compensations to be made in spacings between the front wall and one or more brackets where the front wall is warped or damaged. In such cases a suitably shorter or suitably longer spacer may be used to effect such compensation and thereby maintain the desired axial alignment between the axes of the engine block bore and the sleeve. Preferably, however, each spacer 8 is attached to its bracket.

Because of the close tolerances (e.g., 0.004 inch or less) as between sleeve 6 and the portions of cutter bar 1 rotating therein and moving longitudinally therealong, sleeve 6 is provided with lubrication compartments 11 so that an appropriate lubricant can be applied and maintained between these closely spaced surfaces.

As can be seen from the Drawings, when the line boring system of this invention is mounted on the front wall in the manner described above, the system is axially aligned such that the forward portion of cutter bar 1 extends through a forwardly positioned lubricated bearing bushing 3 and a rearward portion of cutter bar 1 extends through lubricated sleeve 6. After oiling the cutter bar, the line boring operation is readily accomplished. In the case, for example, of an engine block or casing having bearing support saddles or bridges of two different sizes, only two suitably sized collar bit cutter assemblies 4 and 5 are needed for boring these saddles or bridges. As seen in FIG. 2, by suitably positioning travel limit collar 2 and collar bit cutter assemblies 4 and 5 on cutter bar 1 and by using a power drill affixed to pin 7, these bearing support saddles or bridges are readily cut to the desired diameters.

To re-bore the back wall of the block or casing 13 to receive an oversized thrust bearing and bushing unit, the cutter bar is carefully retracted until collar bit cutter assembly 5 is close to or abuts the front of sleeve 6. Then a tool bit 15 of suitable size is inserted and tightly screwed into the collar of assembly 5, and travel limit collar 2 is relocated to a suitable preselected position on bar 1 as illustrated in FIG. 5. Thereupon, after application of lubricant, the thrust bearing cut is accomplished, again using a hand-held electric power drill unit to effect rotation of the entire cutter bar assembly.

It will be seen from the foregoing that sleeve 6 serves a multiplicity of functions in the systems of this invention. In the first place it axially aligns the cutter bar assembly in the proper position relative to the axis of the engine bore to be cut by the system. Secondly the length of sleeve 6 is such as to keep the cutter bar properly aligned in this manner by resisting changes in such axial alignment during the set up and cutting operations. Thirdly, the back end of sleeve serves as a stop for travel limit collar 2 to thereby enable precision boring to suitable depths and avoid forward travel beyond desired preset limits. And fourthly, the front end of sleeve 6 serves as a stop for the rearmost collar bit cutter assembly (assembly 5 in the system depicted) during retraction of the cutter bar preparatory to making the thrust bearing cut in the back wall of the engine block or casing.

It will of course be understood and appreciated that many variations can be made in the design and construction of the line boring systems of this invention to adapt the system for use with engine blocks or casings or other units of different shapes and sizes or when made from metal alloys of differing hardness. Thus this invention is not intended to be limited by the specific exemplifications presented herein. Rather, what is intended to be covered is within the spirit and scope of the ensuing claims.

What is claimed is:

1. Apparatus for axially aligning a cylindrical cutting bar with a body having a linear bore, said body including a member having a plurality of apertures therein which are disposed radially at predetermined radial distances from the axis of said bore, said apparatus comprising (i) a cylindrical cutting bar having affixed thereto a travel limit collar and at least one cutter assembly; (ii) a sleeve having a bore therein sized to accommodate with close tolerance of 0.004 inch or less at least a portion of the cutting bar to enable such portion to be rotatably moved longitudinally therethrough, and (iii) a plurality of radially extending brackets affixed to said sleeve, said apparatus being characterized in that:

(1) said brackets each have at least one aperture therein at a predetermined radial distance from the axis of the bore of said sleeve, said brackets being disposed relative to said sleeve such that (a) the apertures of the brackets can be axially aligned with at least some of said apertures in said member, and (b) when such apertures are so-aligned, the bore of the sleeve and the bore of the body are in axial alignment;

(2) said collar is positioned so as to abut the back end of said sleeve to prevent further forward longitudinal travel of said cutter bar; and (3) the rearmost said assembly is positioned so as to abut the front end of said sleeve to prevent further rearward longitudinal travel of said cutter bar.

2. Apparatus as claimed in claim 1 further characterized in that the apparatus includes four said brackets affixed to said sleeve, said brackets being disposed at approximately 90° intervals around said sleeve.

3. Apparatus as claimed in claim 1 further including a plurality of hollow spacers each of which is adapted to be interposed between the axially aligned apertures of the brackets and apertures in said member when said respective apertures are so-aligned.

4. Line boring apparatus for line boring a body having a linear bore, said body including a member having a plurality of apertures therein which are disposed radially at predetermined radial distances from the axis of said bore, said apparatus comprising:

(i) an elongate cylindrical cutting bar having affixed thereto at least one cutter assembly;

(ii) a linear sleeve having a bore therein sized to accommodate with close tolerance at least a portion of the cutting bar to enable such portion to be rotatably moved longitudinally therethrough; and (iii) a plurality of radially extending brackets affixed to said sleeve, said brackets each having at least one aperture therein at a predetermined radial distance from the axis of the bore of said sleeve, said brackets being disposed relative to said sleeve such that (a) the apertures of the brackets can be axially aligned with at least some of said apertures in said member, and (b) when such apertures are so-aligned, the bore of the sleeve and the bore of the body are in axial alignment;

said apparatus being further characterized in that the rearmost of said assemblies is positioned so as to abut the front end of said sleeve to prevent further rearward longitudinal travel of said cutter bar when said bar is retracted from a more forward position.

5. Apparatus as claimed in claim 4 further characterized by including at least two of said cutter assemblies affixed to said bar.

6. Apparatus as claimed in claim 5 further characterized in that said cutter assemblies are detachably securable to said bar so that the position of said assemblies along the length of said bar can be changed to selected positions.

7. Apparatus as claimed in claim 4 further characterized in that (1) the apparatus includes at least two of said cutter assemblies affixed to said bar, said cutter assemblies being detachably securable to said bar so that the position of said assemblies along the length of said bar can be changed to selected positions and the rearmost of said assemblies is positioned so as to abut the front end of said sleeve to prevent further rearward longitudinal travel of said cutter bar when said bar is retracted from a more forward position; and (2) the apparatus includes a travel limit collar affixed to said bar so as to abut the back end of said sleeve to prevent further forward longitudinal travel of said cutter bar, said collar being detachably securable to said bar so that the position of said collar along the length of said bar can be changed to selected positions.

8. Apparatus as claimed in claim 4 further including a plurality of hollow spacers each of which is interposed between the axially aligned apertures of the brackets and apertures in said member when said respective apertures are so-aligned, said spacers maintaining the axial alignment of the bore of said sleeve and the bore of said body.

9. Apparatus as claimed in claim 4 further characterized in that the apparatus includes four said brackets affixed to said sleeve, said brackets being disposed at approximately 90° intervals around said sleeve.

10. Apparatus as claimed in claim 4 further characterized in that (1) the apparatus includes at least two of said cutter assemblies affixed to said bar, said cutter assemblies being detachably securable to said bar so that the position of said assemblies along the length of said bar can be changed to selected positions, and the rearmost of said assemblies is positioned so as to abut the front end of said sleeve to prevent further rearward longitudinal travel of said cutter bar when said bar is retracted from a more forward position; (2) the apparatus includes a travel limit collar affixed to said bar so as to abut the back end of said sleeve to prevent further forward longitudinal travel of said cutter bar, said collar being detachably securable to said bar so that the position of said collar along the length of said bar can be changed to selected positions; and (3) the apparatus includes a plurality of hollow spacers each of which is interposed between the axially aligned apertures of the brackets and apertures in said member when said respective apertures are so-aligned, said spacers maintaining the axial alignment of the bore of said sleeve and the bore of said body.

11. Apparatus as claimed in claim 10 further characterized in that said sleeve has at least one lubrication compartment therein.

12. Apparatus as claimed in claim 10 further characterized in that the apparatus includes four said brackets affixed to said sleeve, said brackets being disposed at approximately 90° intervals around said sleeve.

13. Line boring apparatus for line boring a body having a linear bore, said body including a member having a plurality of apertures therein which are disposed radially at predetermined radial distances from the axis of said bore, said apparatus comprising:

(i) an elongate cylindrical cutting bar having affixed thereto at least one cutter assembly;

(ii) a linear sleeve having a bore therein sized to accommodate with close tolerance at least a portion of the cutting bar to enable such portion to be rotatably moved longitudinally therethrough; and (iii) a plurality of radially extending brackets affixed to said sleeve, said brackets each having at least one aperture therein at a predetermined radial distance from the axis of the bore of said sleeve, said brackets being disposed relative to said sleeve such that (a) the apertures of the brackets can be axially aligned with at least some of said apertures in said member, and (b) when such apertures are so-aligned, the bore of the sleeve and the bore of the body are in axial alignment;

said apparatus further including a travel limit collar affixed to said bar, said collar being positioned so as to abut the back end of said sleeve to prevent further forward longitudinal travel of said cutter bar.

14. Apparatus as claimed in claim 13 further characterized in that said travel limit collar is detachably securable to said bar so that the position of said collar along the length of said bar can be changed to selected positions.

15. Apparatus as claimed in claim 13 further characterized in that the apparatus includes four said brackets affixed to said sleeve, said brackets being disposed at approximately 90° intervals around said sleeve.

16. Apparatus as claimed in claim 13 further including a plurality of hollow spacers each of which is interposed between the axially aligned apertures of the brackets and apertures in said member when said respective apertures are so-aligned, said spacers maintaining the axial alignment of the bore of said sleeve and the bore of said body.

17. Apparatus as claimed in claim 13 further characterized in that said sleeve has at least one lubrication compartment therein.

* * * * *